Feb. 25, 1958 P. L. MICHAEL ET AL 2,824,558
EAR PLUG
Filed May 24, 1956
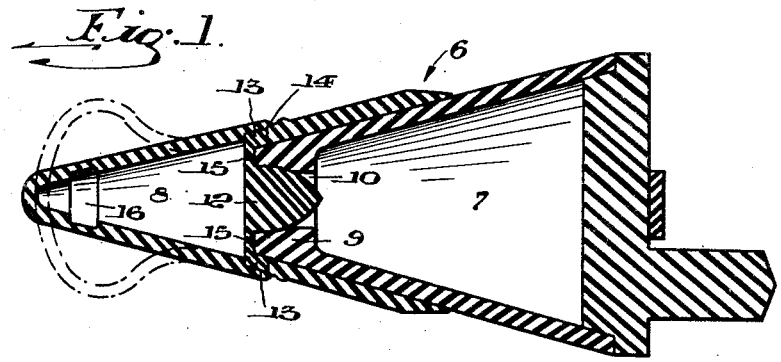
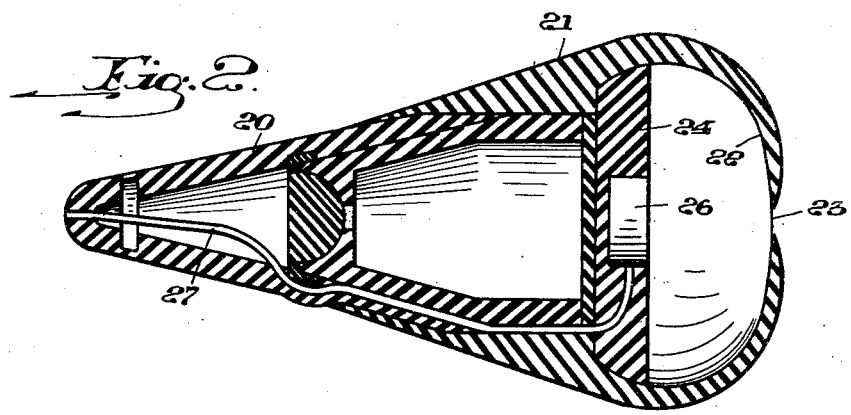
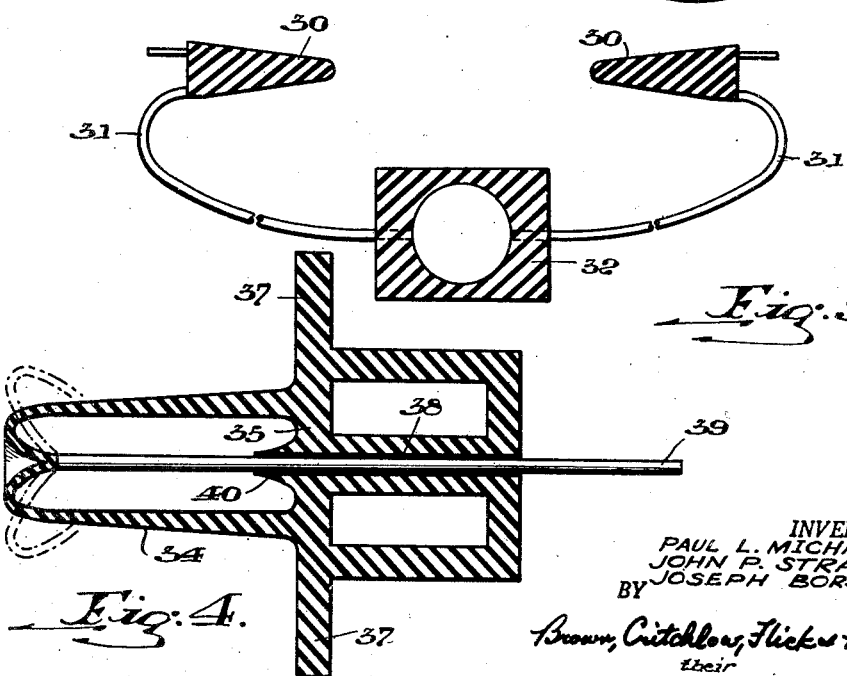
INVENTORS.
PAUL L. MICHAEL
JOHN P. STRANGE
JOSEPH BORSH
BY
Brown, Critchlow, Flick & Peckham
their ATTORNEYS.

United States Patent Office 2,824,558
Patented Feb. 25, 1958

2,824,558

EAR PLUG

Paul L. Michael, Forest Hills, Joseph Borsh, Pittsburgh, and John P. Strange, Murraysville, Pa., assignors to Mine Safety Appliances Company, Pittsburgh, Pa., a corporation of Pennsylvania Application May 24, 1956, Serial No. 587,101

7 Claims. (Cl. 128—152)

This invention relates to ear protecting devices and is particularly concerned with a plug adapted to be inserted into the ear canal and be fitted while in place.

The insert type ear protector, which materially reduces the noise that can reach the inner ear, is a well known and widely used ear protective device. Such protectors plug the external ear canal, thus providing an acoustical barrier between a hazardous noise and the inner end where acoustic trauma can occur. The effectiveness of such protectors is largely dependent upon the seal between the protector and the lining of the ear canal. Obviously, a proper fitting is of the utmost importance, but it is difficult to obtain.

Expansible plugs have been proposed, but they have been of a cumbersome nature with inadequate valve mechanisms. Other protectors include those which may be fitted and formed by hand, such as the wax type, and those which are of a predetermined shape and are provided in various sizes, such as molded plugs. Jaw movements change the shape of the ear canal and thus may cause a non-resilient protector to work loose, thereby destroying its effectiveness. Hand formed protectors, such those composed of wax, are particularly undesirable from a hygienic view-point. In these protectors a consistently good fitting is difficult to obtain in view of the widely differing sizes and shapes of ear canals.

It is an object of the present invention to provide a plug type ear protector which can be adjusted in place to effect a proper fitting in an ear canal.

It is another object of this invention to provide an ear plug which is reusable and can be inserted and adjusted without the necessity of touching portions of the plug which come into contact with the ear canal.

It is yet another object to provide a fluid expansible ear plug that is composed entirely of a soft resilient material so that no damage is inflicted upon the user, by the plug, in the event of receiving a blow to the external ear.

It is a further object to provide an ear plug which transmits desired sounds, but prevents unwanted sounds from reaching the inner ear.

It is another object to provide a valve which can be used in conjunction with fluid expansible ear plugs.

In accordance with the present invention a plug is provided which is made of a resilient material and, after insertion into an ear canal, can be adjusted, as by the application of a force from within the plug to effect expansion, whereby the plug assumes the size and shape of the ear canal. This expansion can be obtained by the use of mechanical or fluid forces. Where fluid forces are employed, passage of fluid into the expansible portion of the plug can be controlled by use of the novel valve of this invention. By providing a tube through the plug terminating at one end, at the inner end of the plug and adapted for connection to an earphone at the other end, the plug effectively prevents the passage of unwanted noise while permitting desired sound waves to reach the inner ear.

The invention will be readily understood upon consideration of the following description in conjunction with the appended drawings, in which:

Fig. 1 is a view, in longitudinal section, of a fluid-actuated plug of the present invention;

Fig. 2 is a modification which is provided with a sound communication tube and means to receive an earphone;

Fig. 3 shows an arrangement of a pair of ear plugs provided with sound communication tubes having extensions terminating in a housing adapted to receive an earphone; and Fig. 4 is a sectional view of a mechanically expansible ear plug.

Referring now to the drawings, in Fig. 1 elongated body 6 of the plug is composed of a soft resilient material, such as rubber. The plug is tapered towards its inner end so that it may be inserted with ease in an ear canal. The plug is hollow, but it is separated into two chambers 7 and 8 by a partition 9 provided with a central orifice 10. The outer chamber 7 may be designated a storage chamber, and the inner chamber 8 an expansion chamber. The two chambers are filled with a fluid, such as air or a liquid. Typical liquids include water, glycerin and mixtures of water and glycerin. Where a liquid is used, a water-glycerin mixture is especially suitable for with it, the rate of transfer of liquid from the storage chamber to the expansible chamber can be easily controlled. Glycerin may be especially useful where a low freezing point and better low frequency attenuation are desired.

It is a feature of this invention that orifice 10 is controlled by a valve, so that fluid from the storage chamber can be forced into the expansion chamber and held there. Accordingly, a valve member 12 is mounted in chamber 8 in sealing engagement with partion 9 around its central orifice 10. The valve member may be held in place by a peripheral flange 13 fitting snugly in an annular recess 14 in the side wall of the expansion chamber. The flange preferably overlaps and encircles the partition to help hold the valve member in place. The valve member likewise is made of resilient material so that the fluid pressure in the storage chamber, when the latter is squeezed, can force the valve member inwardly away from the partition. When this occurs, fluid is forced from the storage chamber through orifice 10 and also through several ports 15 extending through the valve member around its central axis, preferably near flange 13. When pressure is removed from the walls of the storage chamber, the valve member will be pressed back tightly against the partition and ports 15 will be closed by the areas of the partition at their ends. Consequently, the partition serves as a valve seat. When the valve member is seated against the partition, ports 15 are sealed by being in contact with the partition thereby providing a seal in addition to that of the valve member about the orifice. The valve thus has two seating actions.

It is desirable to have orifice 10 at the center of the partition, because then the pressure of the fluid from the storage chamber will be directed against the central part of the valve member and force it easily away from the partition. It also is preferred to provide the valve member with a projection which extends into the orifice of the partition and engages the side wall thereof. Consequently, effective seals can be obtained even though the plug parts are quite small.

After this plug has been inserted in the ear, the outer storage chamber 7 is squeezed to force fluid into the inner chamber 8 and expand it into snug engagement with the surrounding ear canal. Most suitably, the wall of the expansion chamber near its inner end is provided with an inside groove 16 that increases the flexibility of that part of the chamber so that it will expand readily into a bulbous enlargement as shown in the dotted lines. Sufficient fluid is transferred until the person using the plug senses a complete fitting. The valve will prevent fluid from escaping the expansion chamber, but after the plug has been pulled out of the ear the valved portion of the plug can be manipulated between the fingers to break the seal and thereby let the fluid return to the storage chamber so that the plug is ready for use again. The plug may be deflated while in the ear by squeezing the plug at the valve member in a manner such that it separates from the partition and allows fluid to return to the storage chamber.

In the modification shown in Fig. 2, the ear plug 20 is similar to the one shown in Fig. 1, but a flexible rubber cap 21 is firmly mounted on the outer end of the plug. This cap is provided with a cup 22 formed for receiving a small earphone 23. The inner face of the phone engages an insert 24 provided with a central recess 26 for receiving sound from the phone. Extending from one side of this recess through the insert and back through the wall of the plug is a flexible tube 27 that then extends through the inner chamber of the plug and through its inner end. The tube should be strong enough to avoid being collapsed by fluid pressure in the ear plug. The advantage of this construction is that undesirable noise is kept out of the ear by the plug, but wanted sounds are communicated to it by the earphone and tube.

The same advantage can be obtained, but with less bulk and weight at the ear plugs, by using the idea disclosed in Fig. 3. The plugs 30 are like those shown in Fig. 1, but they are provided with acoustic tubes 31 similar to those of Fig. 2. The tubes are much longer, however, and extend away from the plugs to a suitable location where they can be connected to an earphone receiving housing 32 that is not supported by either plug.

In the embodiment of the invention shown in Fig. 4, the inner end of the resilient ear plug is adapted to be expanded by mechanical means. The plug has a tapered expansible section 34 separated at its outer end by a transverse wall 35 from an outer section that can be held between the fingers. The inner end of the outer section is encircled by a radial flange 37 that limits the distance the plug can be inserted in the ear. Extending axially through the outer section and the transverse wall is a small passage 38 that snugly receives a rod 39. The outer end of the rod projects from the plug, and its inner end engages the center of the expansible section's end wall, which is turned back into that section toward the transverse wall 35.

After this plug has been inserted in the ear, the rod is pushed inwardly to straighten the end wall at the inner end of the plug and, because of the thinness of the adjoining side wall, the inner end portion of the expansible section will be enlarged or expanded radially as indicated in dotted lines. This will seal the plug in the ear. The rod is held in its inner position by the one-way seizing action of a tapered lip 40 which encircles the rod and is integrally joined to the transverse wall. In order to remove the plug from the ear, the radial flange 37 is bent outward, which has the effect of opening the lip and permitting the rod to slide out through the plug as the expansible section contracts.

According to the provisions of the patent statutes, we have illustrated and described what we now consider to be the best embodiments of our invention. However, we desire to have it understood that, within the scope of the appended claims, the invention may be practiced otherwise than as specifically illustrated and described.

We claim:

1. An ear plug adapted to be inserted in an ear canal and then expanded into the size and shape thereof, comprising a hollow elongated fluid-containing resilient body tapered towards its inner end for easy insertion into an ear canal, the inner end portion of said body being expansible laterally, and a valve within said body separating it into inner and outer chambers, said valve being adapted to admit fluid to the inner chamber to expand it upon manual compression of the wall of the outer chamber and to retain said fluid in the inner chamber while the plug is in use.

2. An ear plug adapted to be inserted in an ear canal and then expanded into the size and shape thereof, comprising a hollow elongated fluid-containing resilient body tapered towards its inner end for easy insertion into an ear canal, the inner end portion of said body being expansible laterally, a valve within said body separating it into inner and outer chambers, said valve being adapted to admit fluid to the inner chamber to expand it upon manual compression of the wall of the outer chamber and to retain said fluid in the inner chamber while the plug is in use, a sound-conducting flexible tube extending longitudinally through said body, and means to receive and retain an earphone adjacent the outer end of said tube.

3. An ear plug according to claim 2 wherein said earphone receiving means is a cap mounted on the outer end of said plug.

4. An ear plug according to claim 2 wherein said earphone receiving means is a housing which is remote from said plug.

5. An ear plug adapted to be inserted in an ear canal and then expanded into the size and shape thereof, comprising a hollow elongated resilient body adapted for easy insertion into an ear canal, a transverse wall within said body separating it into inner and outer chambers, the inner end of said inner chamber being turned back into the inner chamber towards said transverse wall, a rod extending axially into said plug through said outer chamber and wall and into said inner chamber, said inner chamber being expansible laterally upon the application of pressure to the turned-back end of said inner chamber by contact of the rod therewith, a tapered lip integral with said transverse wall and encircling said rod, said lip frictionally engaging said rod to retain it against the inner end of said inner chamber while said inner chamber is expanded.

6. An ear plug adapted to be inserted in an ear canal and then expanded into the size and shape thereof, comprising a hollow elongated fluid-containing resilient body tapered towards its inner end for easy insertion into an ear canal, the inner end portion of said body being expansible laterally, a partition in said body separating it into inner and outer chambers, an orifice through said partition, a valve member mounted in said inner chamber in sealing engagement with said partition around said orifice, and a port through said valve member spaced circumferentially with respect to the axis of said orifice, said valve member being made of resilient material so that it can be forced inwardly away from said partition to admit fluid through said port to the inner chamber for expansion thereof upon manual compression of the side wall of the outer chamber.

7. A plug according to claim 6, in which said fluid comprises glycerin.

References Cited in the file of this patent

UNITED STATES PATENTS

| 259,682 | Gruber | June 20, 1882 |
| 2,053,995 | Hoey | Sept. 8, 1936 |
| 2,370,451 | Dank | Feb. 27, 1945 |

FOREIGN PATENTS

| 27,839 | Great Britain | Nov. 21, 1912 |
| 643,927 | Great Britain | Sept. 27, 1950 |